US006813467B2

(12) United States Patent
Kawahara et al.

(10) Patent No.: US 6,813,467 B2
(45) Date of Patent: Nov. 2, 2004

(54) IMAGE FORMING APPARATUS

(75) Inventors: Shinichi Kawahara, Tokyo (JP); Satoshi Takano, Tokyo (JP); Toshihiro Sugiyama, Tokyo (JP); Hiroshi Saitoh, Chiba (JP); Hirokazu Ishii, Tokyo (JP); Yuji Arai, Kanagawa (JP); Shigeru Yoshiki, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 10/452,295

(22) Filed: Jun. 3, 2003

(65) Prior Publication Data

US 2003/0235424 A1 Dec. 25, 2003

(30) Foreign Application Priority Data

Jun. 3, 2002 (JP) .................................... 2002-161162
Nov. 1, 2002 (JP) .................................... 2002-320238

(51) Int. Cl.[7] ............................................ G03G 21/00
(52) U.S. Cl. ......................... 399/353; 399/350; 399/71
(58) Field of Search ......................... 399/71, 349, 350, 399/352, 353, 354, 355, 358, 351, 345, 346, 347; 15/256.51, 256.52

(56) References Cited

U.S. PATENT DOCUMENTS

| | | | |
|---|---|---|---|
| 4,521,099 | A | 6/1985 | Katayama et al. |
| 5,204,034 | A | 4/1993 | Sasame et al. |
| 5,794,108 | A | 8/1998 | Yoshizawa et al. |
| 5,799,229 | A | 8/1998 | Yokoyama et al. |
| 5,828,935 | A | 10/1998 | Tatsumi et al. |
| 5,909,609 | A | 6/1999 | Yahata et al. |
| 5,909,610 | A | 6/1999 | Yoshiki et al. |
| 5,923,936 | A | 7/1999 | Tanoue et al. |
| 5,930,573 | A | 7/1999 | Miyamoto et al. |
| 5,950,055 | A | 9/1999 | Yahata et al. |
| 5,950,062 | A | 9/1999 | Yahata et al. |
| 5,970,290 | A | 10/1999 | Yoshiki et al. |
| 6,112,046 | A | 8/2000 | Suzuki et al. |
| 6,188,862 | B1 | 2/2001 | Ishii |
| 6,282,386 | B1 | 8/2001 | Ishii |
| 6,337,957 | B1 | 1/2002 | Tamaki et al. |
| 6,421,511 | B2 | 7/2002 | Sugiyama et al. |
| 6,430,383 | B1 | 8/2002 | Sugiyama et al. |
| 6,522,855 | B1 | 2/2003 | Katoh et al. |
| 6,532,355 | B2 | 3/2003 | Saitoh et al. |
| 6,606,468 | B2 | 8/2003 | Yoshiki |

FOREIGN PATENT DOCUMENTS

| | | | |
|---|---|---|---|
| JP | 03-135593 | * | 6/1991 |
| JP | 05-188830 | * | 7/1993 |

OTHER PUBLICATIONS

Patent Abstracts of Japan, JP 2000–155514, Jun. 6, 2000.
Patent Abstracts of Japan, JP 07–175394, Jul. 14, 1995.
Patent Abstracts of Japan, JP 05–119687, May 18, 1993.
Patent Abstracts of Japan, JP 03–135593, Jun. 10, 1991.

* cited by examiner

*Primary Examiner*—Hoang Ngo
(74) *Attorney, Agent, or Firm*—Oblon, Spivak, McClelland, Maier & Neustadt, P.C.

(57) ABSTRACT

An image forming apparatus including a cleaning device for removing toner, paper dust and other impurities left on an image carrier after image transfer with a cleaning member is disclosed. The cleaning member contacts the surface of the image carrier with variable pressure and remains, about the time when the image carrier stops moving after image formation, in contact with the surface with pressure lower than pressure capable of scrapping off the impurities. Before movement for image formation, the image carrier is driven in a reverse direction opposite to a forward direction assigned to image formation, stopped, and again moved in the forward direction and then in the reverse direction at least one time.

61 Claims, 14 Drawing Sheets

FIG. 8

| No | MAIN POLE P1 | P2 — P3 MAGNETIC FORCE | WHITE SPOTS | CARRIER DROP & SMEAR |
|---|---|---|---|---|
| 1 | 111 | 6 | 22 | ○ |
| 2 | 112 | 4 | 17 | ○ |
| 3 | 118 | 12 | 7 | ○ |
| 4 | 123 | 16 | 6 | × |
| 5 | 127 | 17 | 6 | × |
| 6 | 130 | 5 | 6 | ○ |

IMAGE FORMING APPARATUS

BACKGROUND OF THE INVENTION

1. Field of the Invention

The present invention relates to an image forming apparatus for forming a toner image on an image carrier with an electrophotographic process and transferring the toner image to a sheet or recording medium either directly or via an intermediate image transfer body. Also, the present invention relates to a developing device included in an image forming apparatus and using a plurality of developing rollers arranged side by side in the direction of rotation of an image carrier and operable with a two-ingredient type developer, i.e., a toner and carrier mixture, and a cleaning device also included in the image forming apparatus for removing residual toner and impurities left on the image carrier with a cleaning blade.

2. Description of the Background Art

It is a common practice with a copier, printer, facsimile apparatus or similar electrophotographic image forming apparatus to charge and then scan an image carrier imagewise for thereby forming a latent image and develop the latent image with toner. The resulting toner image is transferred to a sheet or recording medium and then fixed on the sheet.

Toner with a small grain size enhances image quality, but is defectively charged due to an increase in the carrier coating ratio of the toner, as known in the art. To solve this problem, it has been customary to increase the surface area of the individual carrier grain for a unit weight for thereby reducing the carrier coating ratio of the toner, so that the probability that the toner contacts the carrier increases. However, another problem with toner having a small grain size is that the carrier easily deposits on the image carrier.

On the other hand, considering the increasing demand for high-speed image formation, developing ability available with a single developing roller is short. In light of this, a plurality of developing rollers may be used. However, if the diameter of each developing roller is reduced to meet the demand for the size reduction of an image forming apparatus, then the rotation speed of the developing roller and therefore a centrifugal force to act on the carrier increases, aggravating carrier deposition on the image carrier. The carrier deposited on the image carrier damages the edge of a cleaning blade expected to remove residual toner from the image carrier. Further, if such carrier is transferred from the image carrier to a sheet, then it damages the surfaces of a pair of fixing rollers when being conveyed via the nip of the fixing rollers. In this manner, the carrier deposited on the image carrier degrades the reliability of the image forming apparatus. Moreover, the carrier deposited on the image carrier increases image density on a sheet and thereby smears an image, lowering image quality.

To obviate carrier deposition stated above, Japanese Patent Laid-Open Publication No. 6-51628 and Japanese Patent No. 2,930,812, for example, each define a specific linear velocity of an image carrier and that of a developing roller by using a magnet roller whose magnetic force is weak. However, developing ability available with the above documents is short because use is made of only one developing roller.

Further, to obviate carrier deposition, the flux density of a main pole for development included in a developing roller maybe increased, as proposed in the past. This scheme is directed mainly toward a developing device of the type using a single developing roller. If such a scheme is applied to a developing device of the type using a plurality of developing rollers, then it effects the flow of a developer between the developing rollers and causes an excessive amount of developer to be conveyed, resulting in overflow and other troubles.

For example, assume that two developing rollers are positioned side by side in the direction of rotation of the image carrier, and that the flux density of the main pole of the downstream developing roller is increased. Then, such an intense magnetic force scoops up the developer even via the gap between the two developing rollers with the result that an excessive amount of developer deposits on the rollers and brings about various problems including the smearing of an image.

Further, the intense magnetic force of the main pole intensifies even a magnetic force at the rear of the main pole, preventing the developer from parting from the downstream developing roller. Consequently, the developer moves in accordance with the rotation of the downstream developing roller and again reaches the upstream developing roller. This is also apt to bring about the smearing of an image and the overflow of the developer. It is therefore difficult to obviate carrier deposition on the image carrier by intensifying the magnetic force.

To increase the magnetic force of the main pole of the developing roller, use may be made of a rare earth magnet exerting an intense magnetic force, as known in the art. Such a magnet, however, intensifies the magnetic forces of the other poles as well and therefore makes it difficult to establish optimum balance between the poles while increasing cost.

To establish optimum balance between poles, we prepared a cylindrical magnet roller by combining magnets each forming a particular pole and used a rare earth magnet for one of the magnets forming the main pole. However, the rare earth magnet with an intense magnetic force caused a developer to follow the rotation of a developing roller and overflow.

Japanese Patent No. 2,545,601 and Japanese Patent Laid-Open Publication No. 2000-81789, for example, each also propose a cylindrical magnet roller in which a rare earth magnet is buried at the main pole for development. However, in Patent No. 2,545,601, the rare earth magnet is 1.15 mm long or thick in the radial direction of the roller and 5 mm long or wide in the circumferential direction of the roller. In this case, although the length in the radial direction is small, the length in the circumferential direction is great and causes the intense magnetic force to effect the other poles, again resulting in the problem stated above. Conversely, in Laid-Open Publication No. 2000-81789, although the rare earth magnet is as short or thin as 3 mm in the radial direction of the roller, it is as long or wide as 4 mm in the circumferential direction of the roller, also resulting in the above problem.

On the other hand, after the transfer of a toner image from the image carrier to a sheet, some toner is left on the image carrier as residual toner. It is therefore a common practice to remove, before the formation a new latent image, the residual toner as well as impurities including paper dust and rosin, Mg, Al, K, and other additives contained in a sheet from the image carrier. Such additives are contained not only in a sheet but also in toner for implementing various characteristics, including chargeability, fixability and fluidity, required of toner.

To remove the residual toner and impurities left on the image carrier, use is often made of a cleaning blade formed of polyurethane or similar elastic material and having its edge pressed against the surface of the image carrier by preselected pressure. However, a problem with the cleaning blade is that as cleaning is repeated, the toner and impurities tend to accumulate between the image carrier and the cleaning blade and vary the pressing condition of the blade, preventing the expected cleaning effect from being achieved. The toner and impurities so caught between the image carrier and the cleaning blade sometimes include even masses of toner. Consequently, if such toner and impurities get through the cleaning blade, cleaning efficiency is lowered and brings about defective images ascribable to the background contamination of the image carrier. In this connection, when a mass of toner is caught between the image carrier and the cleaning blade, the residual toner on the image carrier gets through the cleaning blade at both sides of the mass.

On the other hand, while the cleaning blade is pressed against the image carrier with preselected pressure, high pressure acts at a portion where the edge of the cleaning blade contacts the image carrier only over a small area. In this condition, if cleaning is repeated with the toner and impurities being caught by the edge of the cleaning blade, then the toner and impurities damage the surface of the image carrier or cause the toner, pressed against the image carrier, to form a thin layer on the image carrier (so-called toner filming). As a result, photoelectric characteristics, particularly chargeability, is lowered on the surface of the image carrier, resulting in low image quality.

In light of the above, when the image carrier is brought to a stop after image formation, the pressure of the cleaning blade acting on the image carrier may be lowered or canceled while the image carrier may be moved in the reverse direction, as proposed in, e.g., Japanese Patent Laid-Open Publication Nos. 2000-155514 (column "0030, FIG. 5) and 05-119687 (column "0011", FIG. 1). Further, the image carrier maybe again moved in the forward direction after the reverse movement and then stopped, as taughtin, e.g., Japanese Patent Laid-Open Publication No. 07-175394. In any case, the reverse rotation of the image carrier is used to cancel pressure acting on the toner and impurities caught by the edge of the cleaning blade, thereby promoting the removal.

However, the conventional reverse rotation schemes stated above have the following problems left unsolved. The cleaning device taught in, e.g., Laid-Open Publication No. 05-119687 mentioned earlier includes a seal positioned at the inlet of the cleaning device where toner is apt to drop and smear surrounding. As for this type of cleaning device, when the image carrier is moved in the reverse direction, it is possible to efficiently remove the impurities caught by the edge of the cleaning blade by increasing the amount of reverse movement in both of the configuration of Laid-Open Publication No. 2000-155514 lacking a seal and the configuration of Laid-Open Publication No. 05-119687 including a seal. However, the portion of the image carrier facing the cleaning device is sometimes moved over the inlet of the cleaning device with the result that the toner deposited on part of the image carrier moved over the inlet drops due to gravity or friction acting between it and the seal.

Particularly, when a peeler or similar sheet separating member and an image density sensor are positioned around the cleaning device, the toner thus dropped from the image carrier accumulates on such members and therefore smears sheets or renders the output of the image density sensor erroneous. More specifically, the toner deposited on the peeler varies frictional resistance between the peeler and a sheet to thereby bring about defective sheet separation or smears the sheet. Also, the toner deposited on the image density sensor makes the output of the sensor differ from the actual image density. Moreover, toner deposits more on the portion of the image carrier facing the cleaning member than on the other portion of the drum. Therefore, when the portion facing the cleaning member moves over the inlet of the cleaning device, a large amount of toner drops and makes the above problem more serious.

Generally, the toner left on the image carrier can be removed more easily if the surface of the image carrier has a smaller coefficient of friction. Stated another way, the removal efficiency decreases with an increase in the coefficient of friction. Particularly, we experimentally found that cleaning ability was lowered when the coefficient of friction was 0.2 or below, as described in copending U.S. patent application Ser. No. 10/418,111 filed on Apr. 18, 2003.

The coefficient of friction has influence on friction energy acting between the cleaning blade and the image carrier. If friction energy is high, then toner is apt to melt and adhere to the image carrier and thereby degrade the removal efficiency of the cleaning blade. This is particularly true when toner with a small grain size is used for enhancing resolution, because such toner has small thermal capacity. The toner adhered to the image carrier and unable to be removed brings about filming stated earlier and deteriorates characteristics on the surface of the image carrier throughout the consecutive image forming steps.

Filming is effected by the hardness of the surface of the image carrier as well. More specifically, when surface hardness is low, the cleaning blade grinds the surface of the image carrier and refreshes it, so that filming occurs little. However, when the image carrier is formed of amorphous silicone (a-Si) implementing a hard surface that wears little or is provided with a surface layer containing inorganic grains, it is difficult for the cleaning blade to grind the surface and therefore obviate filming.

In the configuration wherein the image carrier is moved in the reverse direction for the purpose stated earlier, the cleaning blade is caused to warp in the opposite direction by the image carrier moving in the reverse direction, allowing the toner and impurities to be released from the edge of the cleaning blade. However, when the image carrier is again moved in the forward direction, it is likely that the toner and impurities so released are again caught by the edge of the cleaning blade. It is therefore difficult to fully prevent the cleaning blade from catching the toner and impurities. This is particularly true when the cleaning blade contacts the image carrier at the downstream edge of its end face, as determined by experiments.

SUMMARY OF THE INVENTION

It is a first object of the present invention to effectively prevent, in a developing device of the type including a plurality of developing rollers positioned side by side and using a two-ingredient type developer, a carrier from depositing on an image carrier and obviating the overflow of the developer and the smearing of an image.

It is a second object of the present invention to prevent, in a developing device of the type described, the intense magnetic force of a main pole from effecting the other poles for thereby reducing, among others, a magnetic force at the rear of the main pole.

It is a third object of the present invention to prevent, in a developing device of the type described, the developer from following the rotation of the developing roller at the rear of the main pole to thereby obviate the overflow of the developer and the smearing of an image.

It is a fourth object of the present invention to broaden, in a developing device of the type described, a range where a flux density is high enough to attract the carrier for thereby obviating carrier deposition more effectively.

It is a fifth object of the present invention to obviate, in a developing device of the type described, carrier deposition more effectively by intensifying the magnetic force of the main magnet.

It is a sixth object of the present invention to provide a reliable image forming apparatus including a developing device of the type described.

It is a seventh object of the present invention to promote, in a cleaning device included in an image forming apparatus, efficient removal of impurities from an image carrier with a simple configuration while protecting the inside of the apparatus from smearing ascribable to the impurities.

An image forming apparatus including a cleaning device for removing toner, paper dust and other impurities left on an image carrier after image transfer with a cleaning member is disclosed. The cleaning member contacts the surface of the image carrier with variable pressure and remains, about the time when the image carrier stops moving after image formation, in contact with the surface with pressure lower than pressure capable of scrapping off the impurities. Before movement for image formation, the image carrier is driven in a reverse direction opposite to a forward direction assigned to image formation, stopped, and again moved in the forward direction and then in the reverse direction at least one time.

BRIEF DESCRIPTION OF THE DRAWINGS

The above and other objects, features and advantages of the present invention will become more apparent from the following detailed description taken with the accompanying drawings in which:

FIG. 8 is a table listing a relation between the magnetic force of the second developing roller and the number of white spots, carrier drop and image contamination;

DESCRIPTION OF THE PREFERRED EMBODIMENTS

To better understand the present invention, brief reference will be made to a conventional developing device, shown in FIG. 1. As shown, the developing device includes two developing rollers 1 and 2 and is therefore superior in developing ability than a developing device including a single developing roller. However, when the diameter of the developing rollers 1 and 2 is reduced to reduce the overall size of an image forming apparatus, the rotation speed of the rollers 1 and 2 increases to thereby increase a centrifugal force acting on the carrier of a developer, as stated earlier. As a result, the carrier deposits on an image carrier, not shown, included in the image forming apparatus.

Further, when the flux density of a main magnetic pole for development is increased, it effects the flow of the developer between the developing rollers 1 and 2 and causes an excessive amount of developer to be conveyed, resulting in the overflow of the developer. For example, when the flux density of the main pole disposed in the downstream developing roller 2 is increased, it scoops up the developer even via the gap between the developing rollers 1 and 2. Consequently, an excessive amount of developer deposits on the developing rollers 1 and 2 and brings about various problems including the smearing of an image.

Furthermore, the intense magnetic force of the main pole intensifies even a magnetic force positioned at the rear of the main pole, preventing the developer from parting from the developing roller 2. Consequently, the developer moves in accordance with the rotation of the developing roller 2, as indicated by an arrow in FIG. 1, and again reaches the upstream developing roller 1. This is also apt to bring about the smearing of an image and the overflow of the developer. It is therefore difficult to obviate carrier deposition on the image carrier by intensifying the magnetic force.

Figure 2:
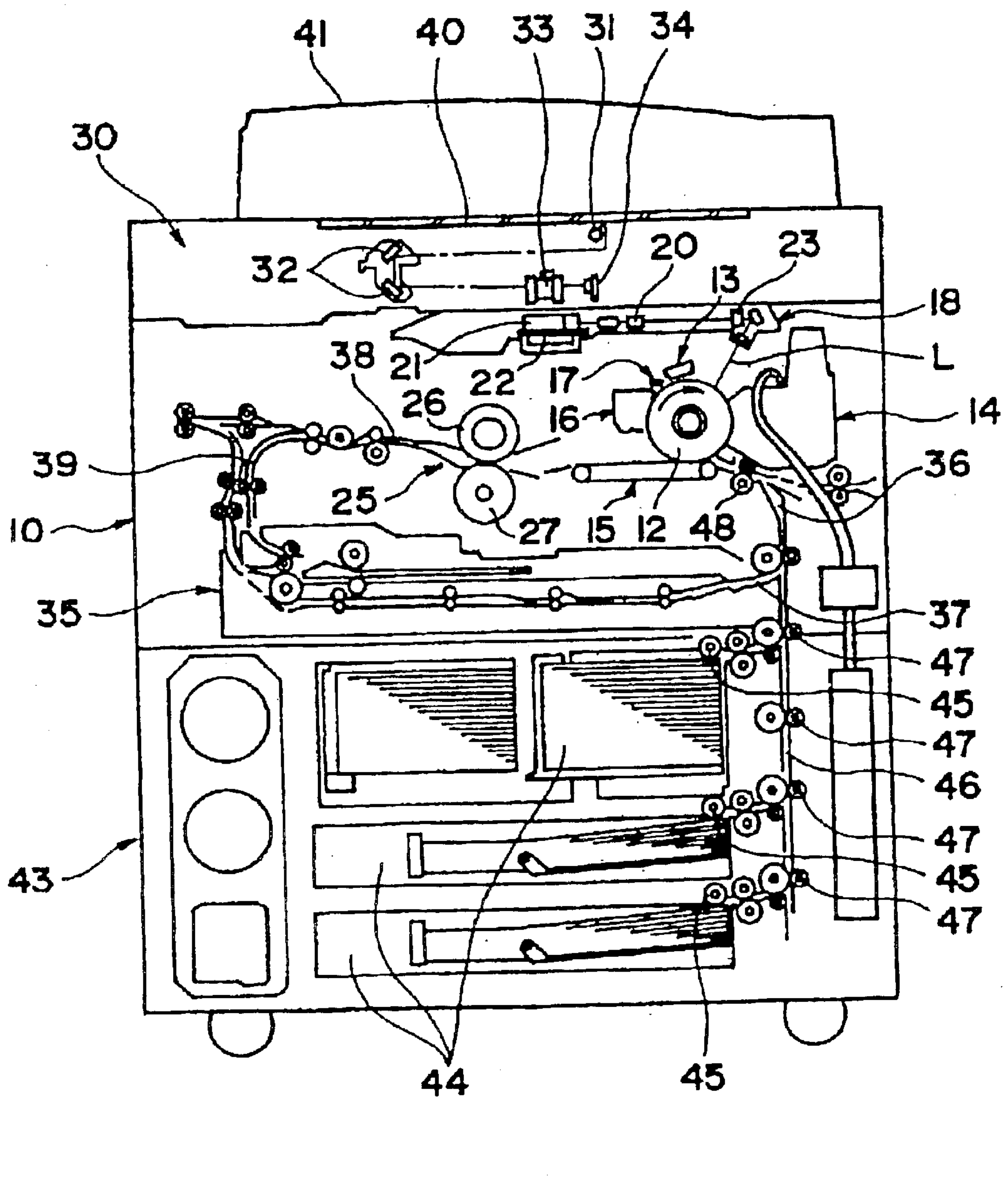
FIG. 2 is a view showing the general construction of an image forming apparatus including a developing device and embodying the present invention.

Referring to FIG. 2, an image forming apparatus including a developing device and embodying the present invention is shown and implemented as a laser copier by way of example. As shown, the laser copier includes a casing 10 and a photoconductive drum or image carrier 12 disposed in the casing 10 and rotatable clockwise, as viewed in FIG. 2. Arranged around the drum 12 are a charger 13, a developing device 14, an image transferring and sheet conveying device 15, a cleaning device 16, and a quenching lamp or discharging device 17.

A laser writing unit 18 is positioned in the upper portion of the casing 10 and includes a laser diode or similar light source 20 that emits a laser beam L, a polygonal mirror 21, a motor 22 for driving the polygonal mirror 21, and optics 23 including an fθ lens. A fixing device 25 is positioned at the left-hand side of the cleaning device 16 and includes a heat roller 26 accommodating a heater and a press roller 27 pressed against the heat roller 26. A scanner or document reading device 30 includes a light source 31, a plurality of mirrors 32, a lens 33, and a CCD (Charge Coupled Device) image sensor or similar image sensor 34.

A duplex copy unit 35 is arranged in the lower portion of the casing 10 and includes a refeed path 37 merging into a path 36, which extends to a position beneath the drum 12. A branch path 39, branching off an outlet path 38, extends from the outlet of the fixing device 25 to the duplex copy unit 35.

A glass platen 40 is mounted on the top of the casing 10. An ADF (Automatic Document Feeder) 41 is hinged to the top of the casing 10 in such a manner as to selectively cover or uncover the glass platen 40.

The casing 10 of the copier is mounted on a table 43 that accommodates a plurality of sheet cassettes 44 stacked one above the other. Pickup rollers 45 each are assigned to one of the sheet cassettes 44 and pay out a sheet from the associated sheet cassette toward the path 46. A plurality of rollers 47 are arranged on the path 46.

In operation, the operator of the copier stacks desired documents on the ADF 41 or opens the ADF 41 and then lays a desired document on the glass platen 40. Subsequently, when the operator presses a start switch, not shown, the scanner 30 reads a document conveyed to the glass platen by the ADF 41 or a document laid on the glass platen 40 by hand on a pixel basis. At the same time, one of the pickup rollers 45 assigned to designated one of the sheet cassettes 44 is caused to pay out one sheet from the sheet cassette to the path 46. The sheet thus paid out is conveyed by the rollers 47 to a registration roller 48. The registration roller 48 once stops the sheet and then conveys it to the position beneath the drum 12 in synchronism with the rotation of the drum 12.

Figure 1:
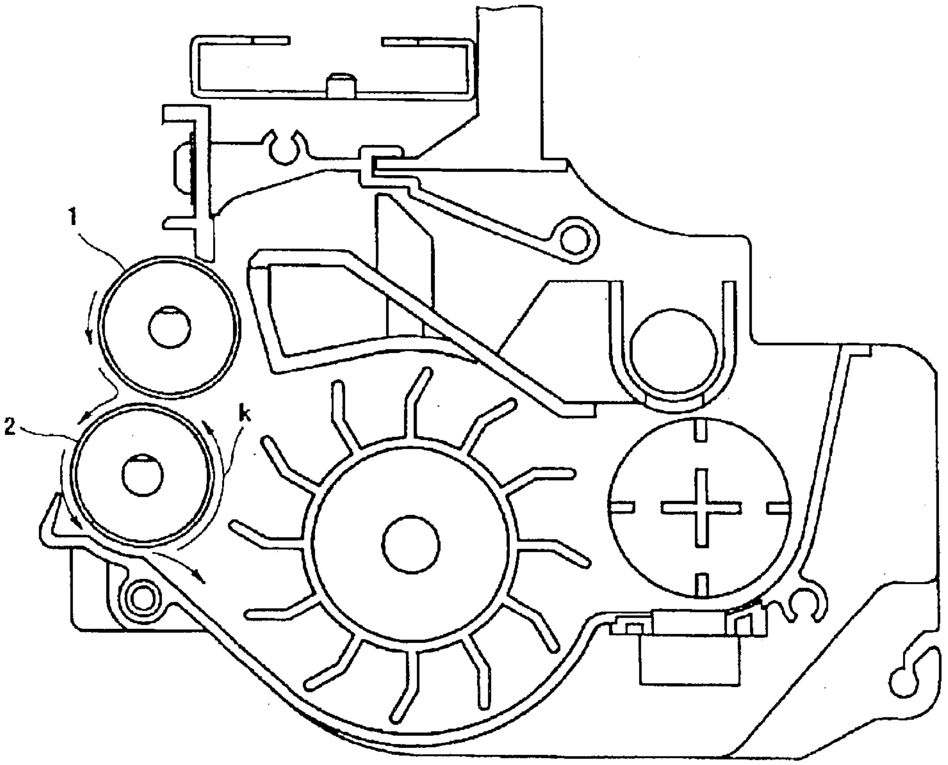
FIG. 1 PRIOR ART
FIG. 1 is a view showing a conventional developing device of the type using two developing rollers.

When the operator presses the start switch, as stated above, the drum 12 starts rotating clockwise, as viewed in FIG. 1. The charger 1 uniformly charges the surface of the drum 12 in rotation. The laser writing device 18 scans the charged surface of the drum 12 with the laser beam L in accordance with image data output from the scanner 30, thereby forming a latent image representative of the document image on the drum 12. Subsequently, the developing device 14 develops the latent image with toner to thereby produce a corresponding toner image.

The image transferring and sheet conveying device 15 transfers the toner image thus formed on the drum 12 to the sheet reached the position beneath the drum 12. The cleaning device 16 removes toner left on the drum 12 after such image transfer. Subsequently, the quenching lamp 17 discharges the cleaned surface of the drum 12 for thereby preparing it for the next image forming cycle.

The sheet, carrying the toner image transferred from the drum 12, is conveyed to the fixing device 25 by the sheet conveying device 15. In the fixing device 25, the heat roller 26 and press roller 27 fix the toner image on the sheet with heat and pressure. The sheet come out of the fixing device 25 is driven out of the copier to a tray, not shown, mounted on the casing 10 via the outlet path 38.

In a duplex copy mode available with the copier, the sheet, carrying the toner image on one side thereof, is steered toward the duplex copy unit 35 via a turn path 39 and again conveyed to the position beneath the drum 12. At this position, another toner image formed on the drum 12 is transferred to the other side of the sheet. Subsequently, the sheet or duplex copy may be driven out to the tray mentioned earlier.

Figure 3:
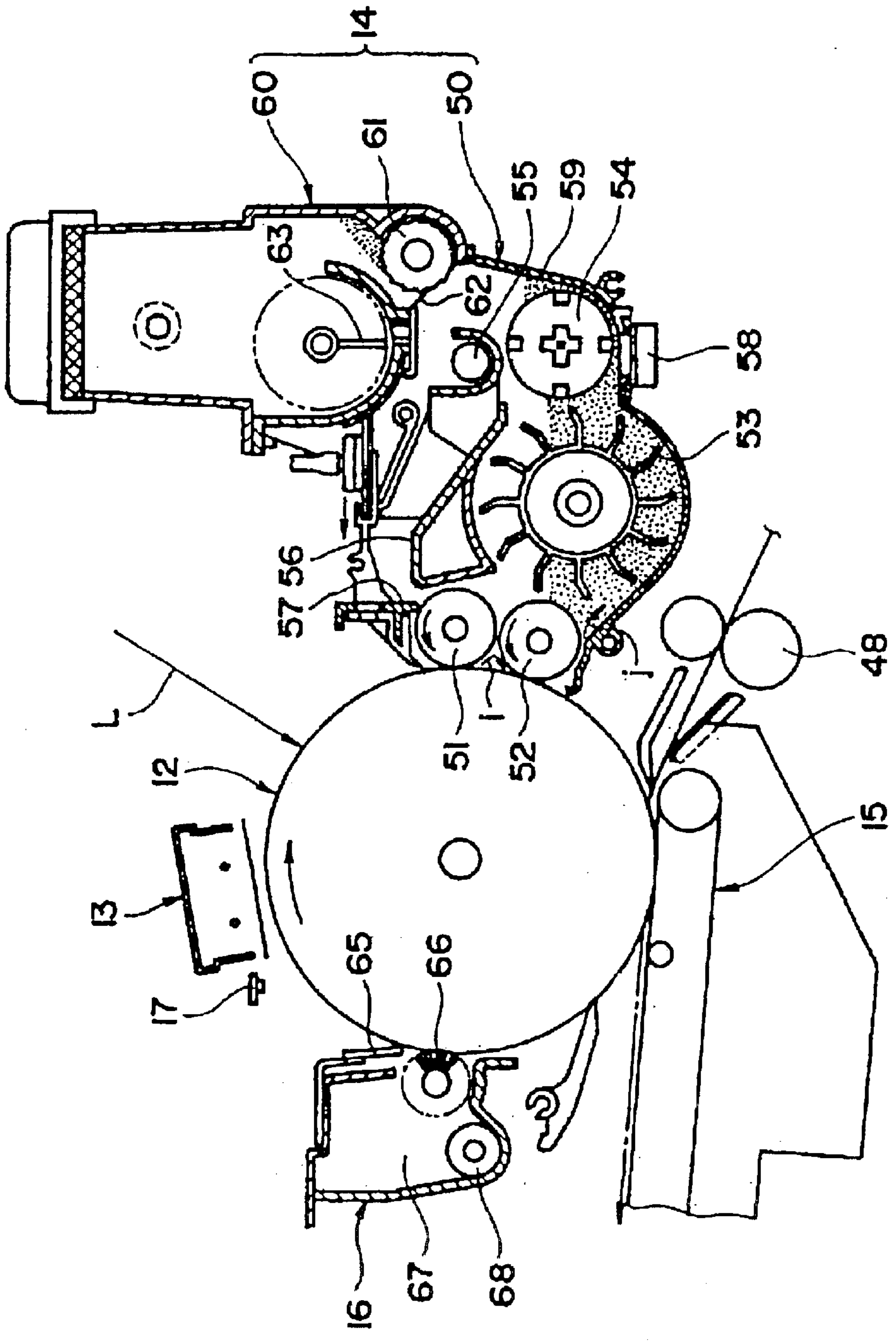
FIG. 3 is a fragmentary enlarged view of the illustrative embodiment.

FIG. 3 shows the developing device 14 in detail. As shown, the developing device 14 is generally made up of a tank 50 and a hopper 60. The tank 50 includes a case 59 accommodating a first and a second developing roller 51 and 52, a paddle wheel 53, an agitator 54 implemented as a roller, a screw 55, a separator 56, a doctor blade 57, and a toner content sensor 58. A two-ingredient type developer, i.e., a toner and carrier mixture is stored in the case 59. The first and second developing rollers 51 and 52 are positioned side by side in the direction of rotation of the drum 12.

Figure 4A:
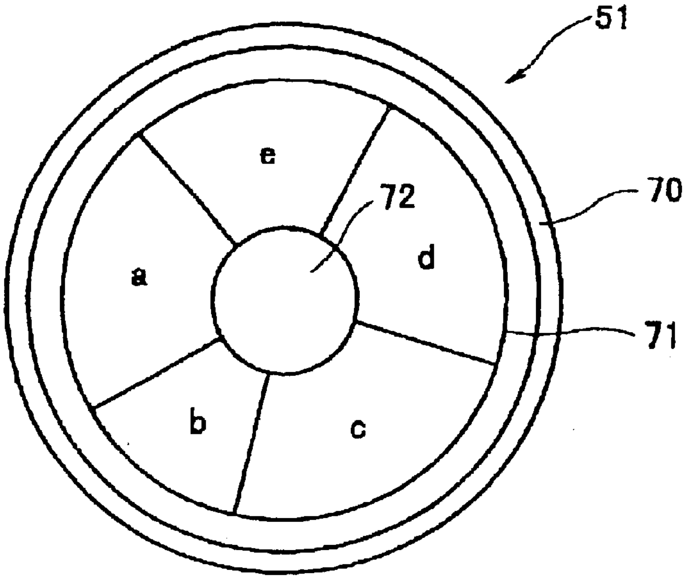
FIGS. 4A and 4B are views respectively showing a first and a second developing roller included in the illustrative embodiment.

As shown in FIG. 4A, the first developing roller 51 is made up of a hollow, cylindrical sleeve 70 and a multiple-pole magnet roller 71 held stationary within the sleeve 70. The magnet roller 71 has five magnets a, b, c, d and e adhered to a single shaft 72, as illustrated. The five magnets a through e comprise a sectorial, resin-coupled magnet based on ferrite each and are separate from each other to form five magnetic poles P1 through P5.

Figure 4B:
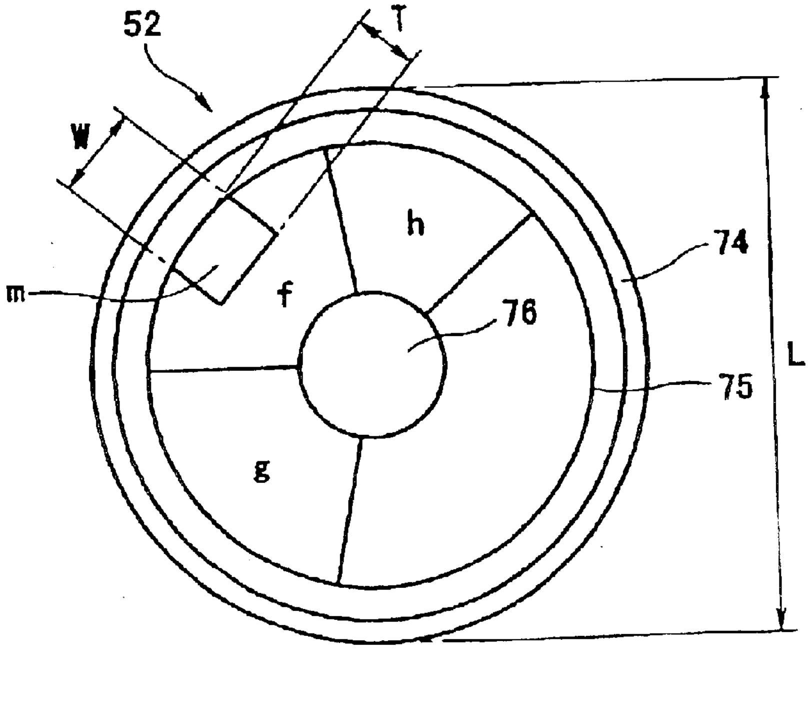

As shown in FIG. 4B, the second developing roller 52 downstream of the first developing roller 51 in the direction of rotation of the drum 12 is made up of a hollow, cylindrical sleeve 74 and a multiple-pole magnet 75 held stationary within the sleeve 74. The magnet roller 75 has three first magnets f, g and h adhered to a single shaft 76. The magnets f through h comprise a sectorial, resin-coupled magnet based on ferrite each and are separate from each other to form three magnetic poles P1 through P3. A second magnet m is buried in the first magnet f, which forms the pole P1, and implemented as an R—Fe—B or similar rare earth magnet. The first magnet f has a length or thickness T in the radial direction of the roller 52 and has a length or width W in the circumferential direction of the roller 52 and is tightly fitted in a groove also having a width W and adhered to the walls of the groove.

In the illustrative embodiment, the length T is selected to be 3 mm, which is 15% of the outside diameter L of the sleeve 74, while the length W is selected to be 4 mm that is 20% of the above outside diameter. This configuration prevents the intense magnetic force of the main pole P1 for development from effecting the other poles and particularly reduces a magnetic force acting at the rear of the pole P1, thereby obviating the problems discussed earlier.

Figure 5:
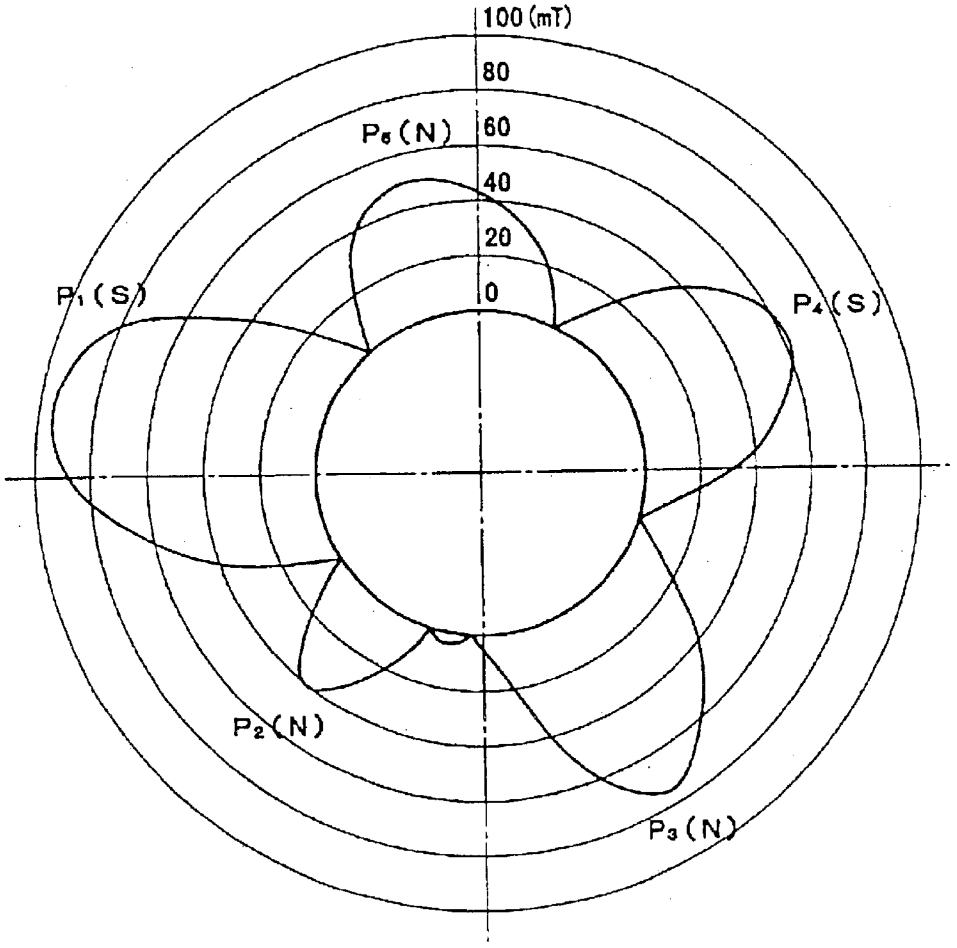
FIG. 5 is a chart showing the flux density distribution of the first roller.
Figure 6:
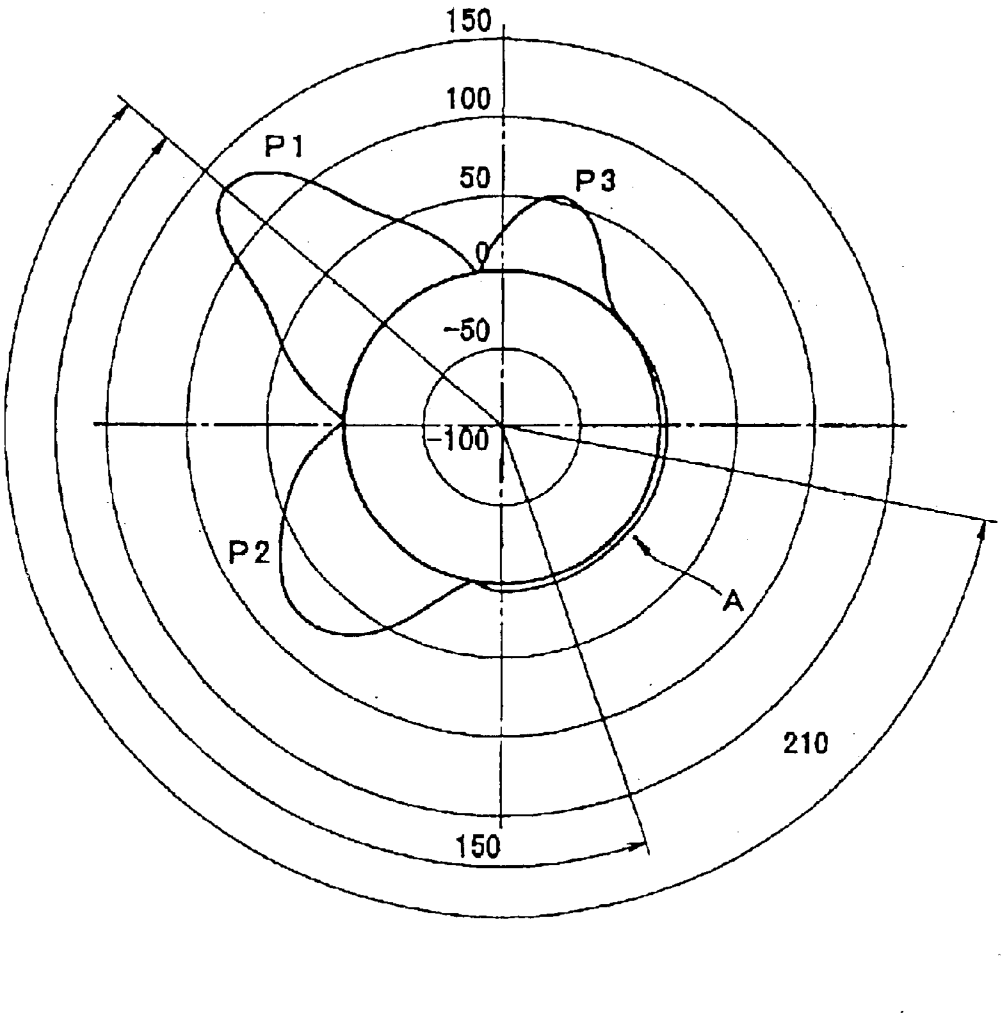
FIG. 6 is a chart showing the flux density distribution of the second roller.

FIGS. 5 and 6 respectively show the flux density waveform of the first developing roller 51 and the flux density waveform of the second developing roller 52. As shown, the main poles P1 of the two developing rollers 51 and 52 are positioned in the vicinity of the drum 12. As shown in FIG. 6, the main pole P1 of the second developing roller 52 is implemented as a single pole and has a flux density of 120 mT or above in the radial direction of the sleeve 74, as measured on the surface of the sleeve 74. Further, the flux density of the developing roller 52 is selected to be 15 mT or below, as measured on the surface of the sleeve 74 in the radial direction, between a position spaced by 150° downstream from the main pole P1 and a position spaced by 210° downstream from the same.

Referring again to FIG. 3, a gear-toothed toner replenishing member 61, a regulating plate 62 and an agitator 63 are disposed in the hopper 60. The hopper 60 stores fresh toner to be replenished to the case 59.

In the case 59, the agitator 54 agitates the developer present in the case 59 while charging it by friction. The paddle wheel 53 in rotation scatters the developer upward. At this instant, because the flux density of the second developing roller 52, as measured on the surface of the sleeve 74 in the radial direction, is 15 mT or below, the developer so scattered upward deposits on the second developing roller 52 little, but deposits on the first developing roller 51.

The developing roller deposited on the first developing roller 51 is conveyed by the sleeve 70 of the roller 51 while being metered by the doctor blade 57 to form a thin layer. At the position where the main pole P1 is located, the developer on the sleeve 70 rises in the form of brush chains with the result that the toner contained in the developer is transferred to the drum 12, developing a latent image carried on the drum 12.

When the developer left on the sleeve 70 of the first developing roller 51 after the above development approaches the second developing roller 52, the developer is transferred from the sleeve 70 to the sleeve 74 of the second developing roller 52, as indicated by an arrow i in FIG. 3. Subsequently, at the position where the main pole P1 of the second developing roller 52 is located, the developer on the sleeve 74 again rises in the form of brush chains, causing the toner to developing the latent image carried on the drum 12. Thereafter, the sleeve 74 in rotation conveys the developed moved away from the main pole P1 to thereby return it to the case 59, as indicated by an arrow j in FIG. 3.

The developing device 14, using the two developing rollers 51 and 52 for development, achieves a wider developing zone and therefore higher developing ability than a developing device using a single developing roller, thereby promoting high-speed development.

When the toner content of the developer present in the case 59 decreases below a target value by more than a preselected amount due to repeated consumption, the agitator 63 is rotated to agitate the fresh toner while conveying it to the toner replenishing member 61. The toner replenishing member 61 in rotation causes the regulating plate 62 to oscillate, thereby replenish the fresh toner from the hopper 60 to the tank 50. This maintains the toner content of the developer substantially constant.

The toner content sensor 58 mounted on the case 59 senses the toner content of the developer present in the case 59. The target toner sensor 58 is set on the basis of the density of a toner pattern or P pattern formed on the drum 12 and measured by a photosensor not shown.

Although the toner deposited on the drum 12 is electrostatically transferred to a sheet by the image transferring device 15, about 10% of the toner is left on the drum 12 as residual toner. The cleaning device 16 removes such residual toner from the drum 12 with a cleaning blade 65 and a brush roller 66. The toner thus removed from the drum 12 is collected in a tank 67 also included in the cleaning device 16. Subsequently, a screw 68 conveys the toner from the tank 67 to one side of the cleaning device 16. As a result, the residual toner is conveyed to a waste toner tank, not shown, via an outlet, not shown, formed in the cleaning device 16.

Figure 7:
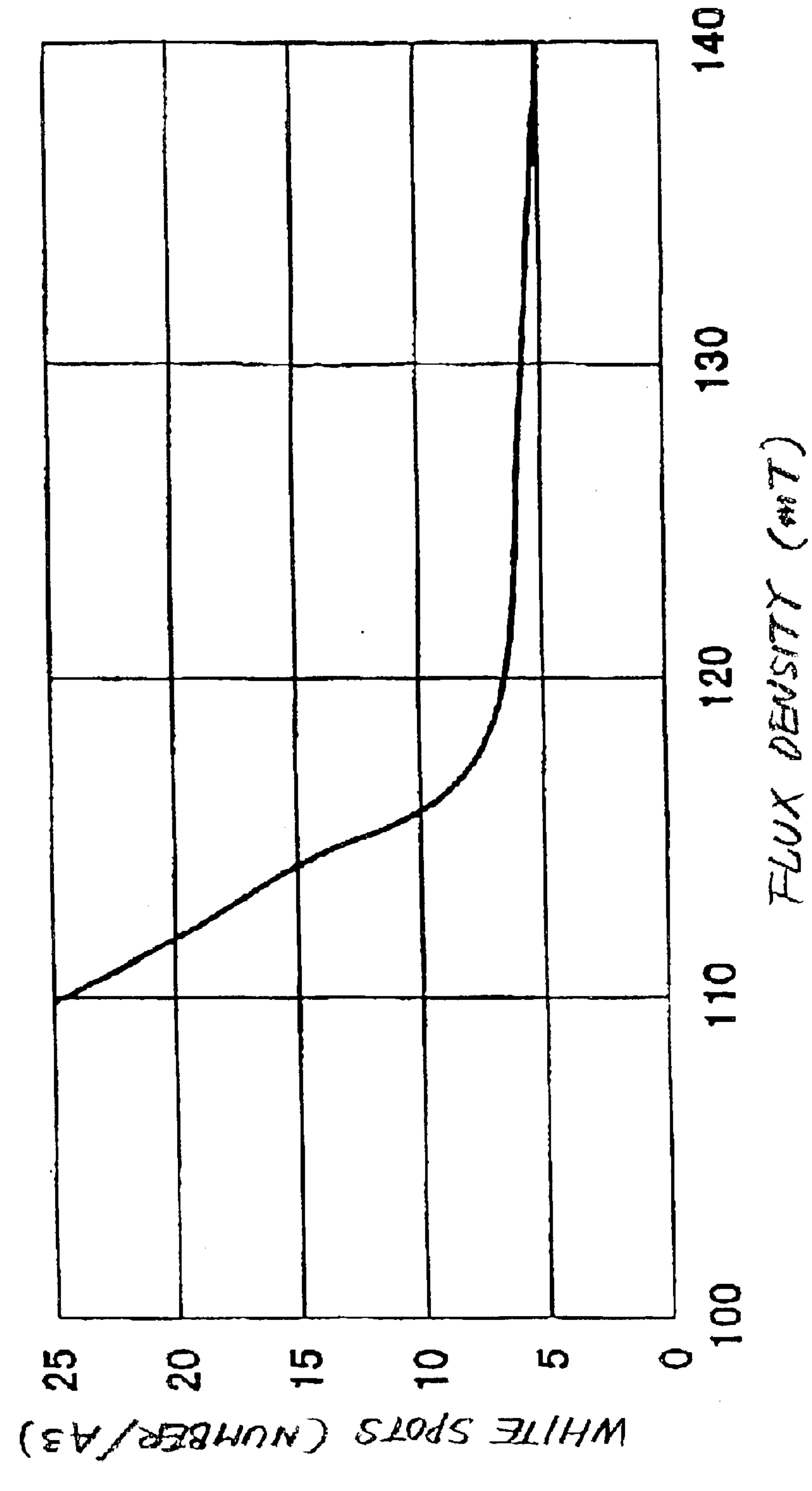
FIG. 7 is a graph showing a relation between the flux density of a main pole included in the second developing roller, as measured on the surface of a sleeve in the radial direction, and the number of white spots appeared on a sheet of size A3.

FIG. 7 shows the results of experiments conducted to determine the mean number of white spots to appear on a sheet of size A4 by varying the flux density of the main pole P1 of the second developing roller 52, as measured on the surface of the sleeve 74 in the radial direction. The experiments were conducted by outputting a dot image, which is apt to suffer from carrier deposition, and feeding no current to the image transferring device 15, i.e., in a condition wherein portions where the carrier is deposited easily appear on a sheet as white spots.

As FIG. 7 indicates, the number of white spots sharply increases as the flux density in the radial direction decreases below 120 mT. The number of white spots is only ten or less if the above flux density is 120 mT or above. It was experimentally found that if the number of white spots was ten or less, then defects ascribable to carrier deposition did not appear.

FIG. 8 shows a relation between the magnetic force of the second developing roller 52, the number of white spots, and the smearing of an image ascribable to carrier drop, as determined by experiments. As shown, when the flux density in the radial direction is 120 mT or above, it is likely that the developer is scooped up via the gap between the first and second developing rollers 51 and 52. However, if the flux density, as measured on the surface of the sleeve 74 in the radial direction, is selected to be 15 mT or below between the 150° point and the 210° point downstream of the main pole P1, as stated earlier, then the developer easily parts from the developing roller 52 between the above two points. This obviates the overflow of the developer ascribable to excessive scoop-up, a double image and other troubles.

Figure 9:
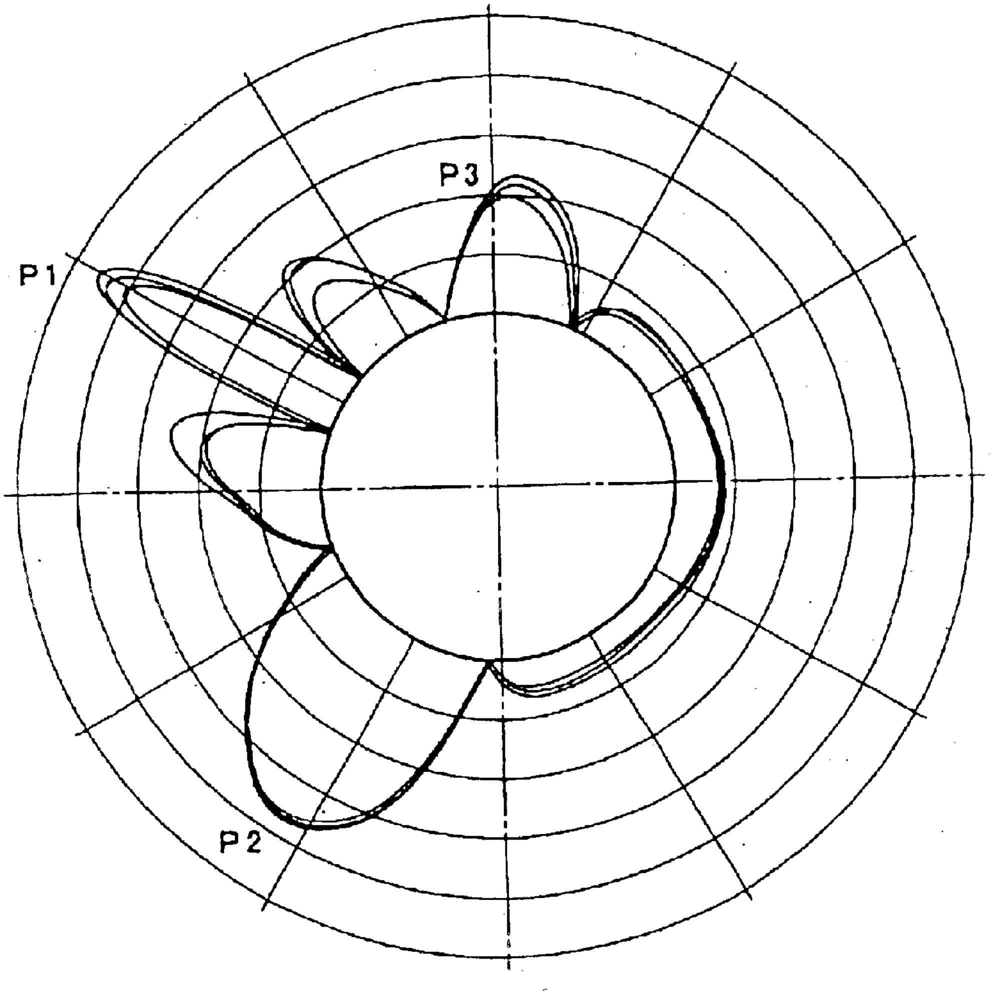
FIG. 9 is a charge showing the flux density distribution of the second developing roller determined when the main pole was implemented by three poles.

As shown in FIG. 9, when the mainpole P1 of the second developing roller 52 is implemented as three poles including two auxiliary poles, the half-value width of the main pole and therefore the nip for development is reduced, enhancing image equality. The three-pole scheme, however, causes the developer to rise even at the auxiliary poles, which do not contribute to development, and is therefore bring about carrier deposition due to the weak magnetic force of the auxiliary poles. By contrast, when the main pole is implemented as a single pole, the number of white spots remains ten or less at all times, obviating defects ascribable to carrier deposition.

With the various advantages described above, the illustrative embodiment realizes a high quality, reliable image forming apparatus.

Figure 10:
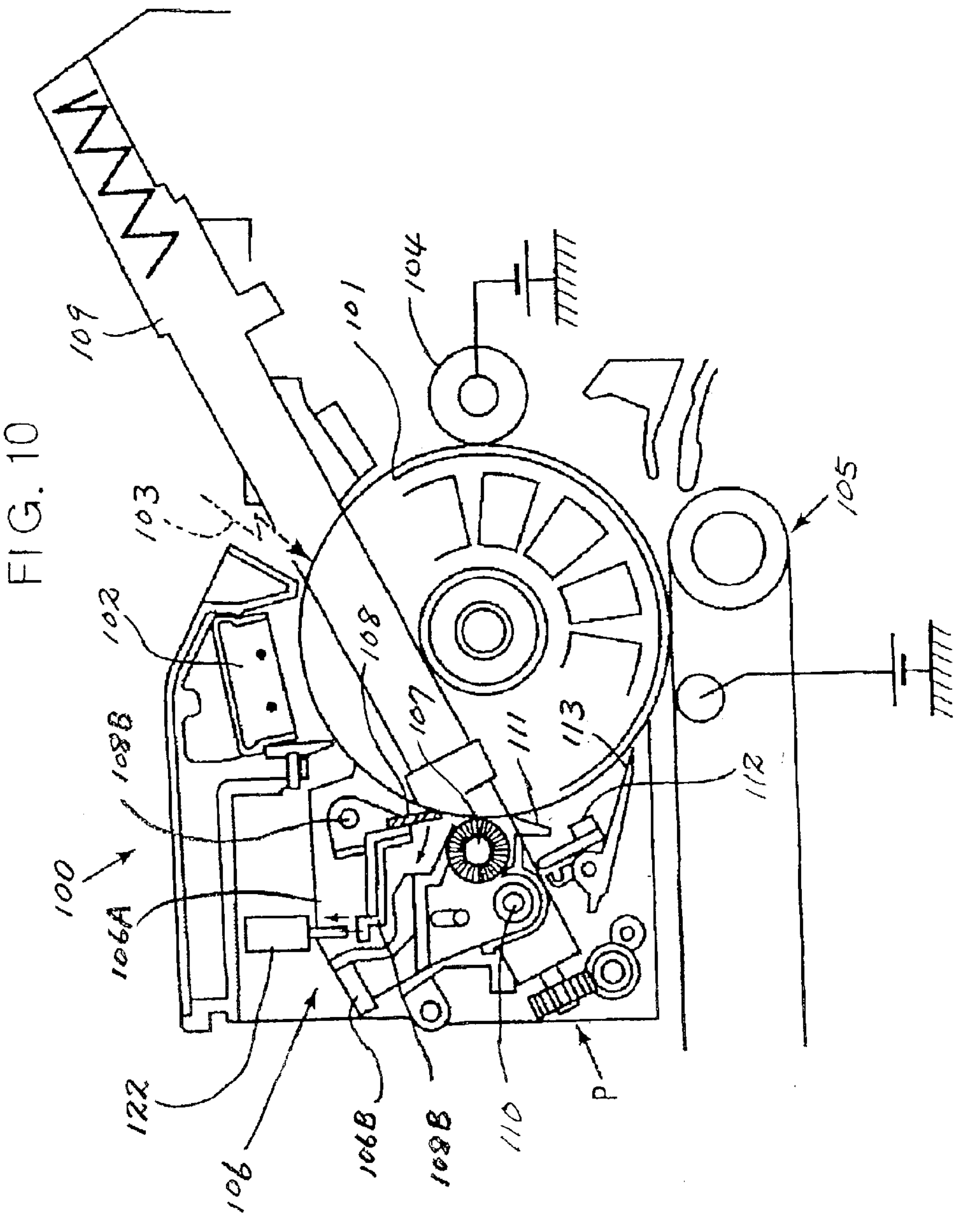
FIG. 10 shows an alternative embodiment of the image forming apparatus in accordance with the present invention.

Reference will be made to FIG. 10 for describing an alternative embodiment of the present invention implemented as a printer by way of example. As shown, the printer, generally 100, includes a photoconductive drum or image carrier 101. Arranged around the drum 101 are a charger 102, an optical writing unit represented by a light beam 103, a developing device 105 and a cleaning device 106 for executing an image forming process. In the illustrative embodiment, the drum 101 is formed of amorphous silicon (a-Si) implementing high surface hardness and wearing little or is provided with a surface layer containing inorganic grains. The drum 101 has a coefficient of friction $\mu$ of 0.2 or above, as measured on the surface of the drum 101.

In operation, the charger 102 uniformly charges the surface of the drum 101 being rotated. The optical writing unit scans the charged surface of the drum 101 with the light beam 103 in accordance with image data, forming a latent image on the drum 101. The developing device 5 develops the latent image with toner for thereby producing a corresponding toner image. The toner image is then electrostatically transferred from the drum 101 to a sheet conveyed from a sheet feeding device not shown. Subsequently, the toner image is fixed on the sheet by a fixing device not shown. As for such an electrophotographic procedure, the illustrative embodiment is identical with the previous embodiment.

After the image transfer, the cleaning device 106 removes the toner and various impurities left on the drum 101. Subsequently, a quenching lamp, not shown, discharges the surface of the drum 101, as stated previously.

In the illustrative embodiment, the cleaning device 106 includes a unit 106A formed with an opening facing the drum 101. A cleaning brush 107 and a cleaning blade 108 are disposed in the unit 106A at the upstream side and downstream side, respectively, in the direction of rotation of the drum 101 and constantly held in contact with the drum 101. The cleaning blade 108 is formed of polyurethane The unit 106A further includes a coil 110, a seal 111, and a vent portion 106B. The coil 110 conveys the toner collected from the drum 101 to a pipe 109, so that the toner can be again used as recycled toner. The seal or sealing member 111 seals the inlet of the unit 106A located at the upstream side in the direction of rotation of the drum 101. An image density sensor 112 is responsive to the density of a toner image. A peeler 113 peels off a sheet from the drum 101.

Figure 11:
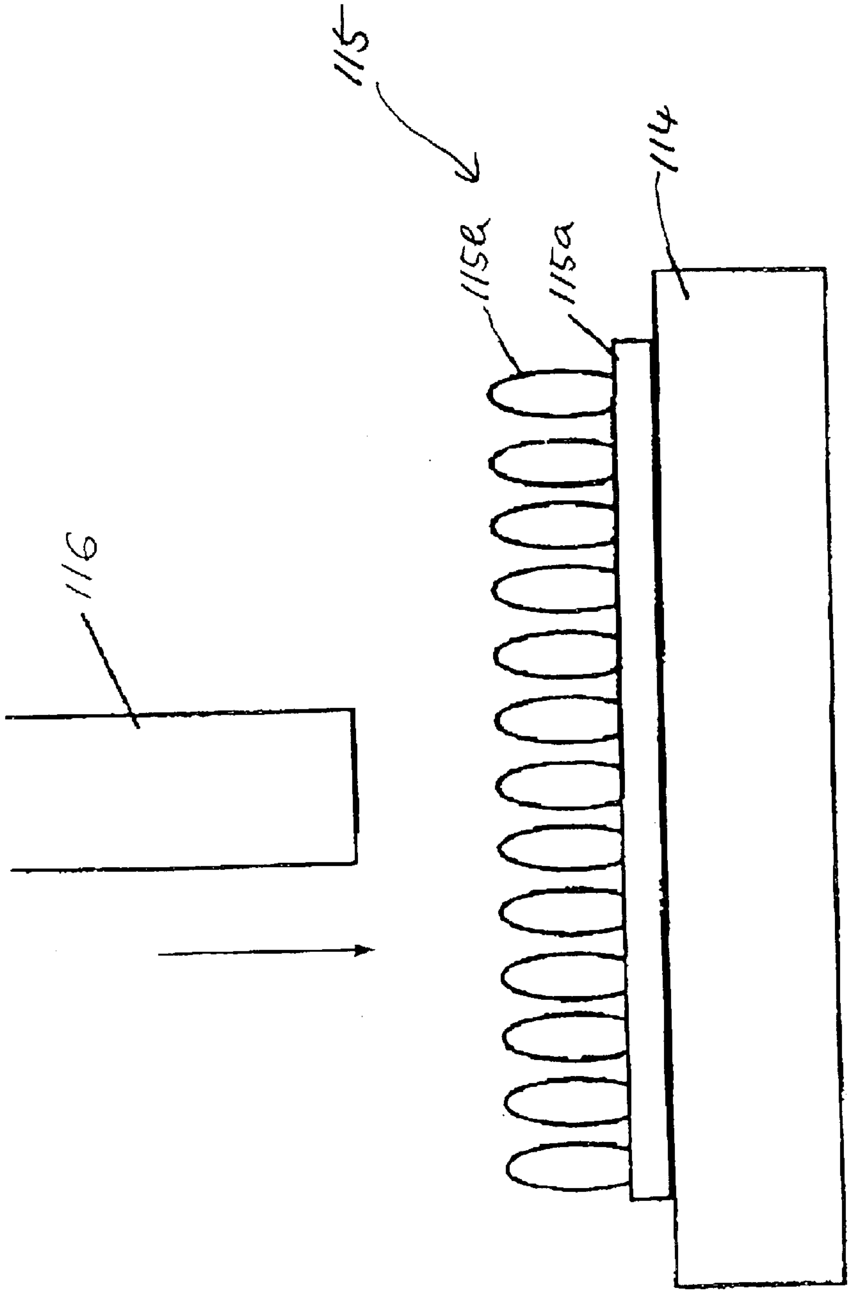
FIG. 11 is a view for describing the contact surface pressure of a cleaning brush.

The cleaning brush 107 is made up of a rotatable roller and fibers implanted in the roller and having loop-like tips. The contact surface pressure of the cleaning brush 107, contacting the drum 10, is selected to be 50 gf/cm$^2$ or above. It is to be noted that the contact surface pressure corresponds to a reaction force generated in the cleaning brush 107 when the brush 107 is caused to bite into the drum 102 by a target amount. More specifically, as shown in FIG. 11, assume that a brush 115 is made up of a base cloth 115*a* and fibers 115*b* implanted in the base cloth 115*a* and is placed on a flat base 114, and that a rod 116, for example, has a flat surface having a unit area of 1 cm$^2$ and facing the brush 115 and bites into the brush 115 by a preselected amount of 1.5 mm. Then, the contact surface pressure refers to the resulting reaction force generated in the brush 115.

The area of the flat surface, facing the brush 115, may be increased, in which case the resulting reaction force will be divided by the area of the flat surface to thereby produce a reaction force for a unit area.

When the brush 115 with the above configuration, as distinguished from a fur brush, contacts the surface of the drum 101, a reaction force necessary for sweeping the residual toner and impurities left on the drum 101 is insured while the surface of the drum 101 is protected from damage. Particularly, as the sweeping ability of the brush 115 is increased, load on the cleaning blade 108 is reduced accordingly, so that filming ascribable to the cleaning blade 108 is reduced.

In the illustrative embodiment, before the drum 101 starts rotating for repeating image formation after previous image formation or at the start-up of the printer 100, the drum 101 is caused to operate, stop, again operate, and then stop and wait for image formation. Such control over the drum 101 will be described hereinafter.

Before rotation for image formation, the drum 101 is caused to move in the reverse direction, then move in the forward direction at least one time, and then move in the reverse direction at least one time. Stated another way, the drum 101 is stopped in the reversely moved position before the start of rotation for image formation. For example, after image formation, the drum 101 is caused to perform a sequence of reverse movement, forward movement, reverse movement and stop one time or a plurality of times.

Figure 12:
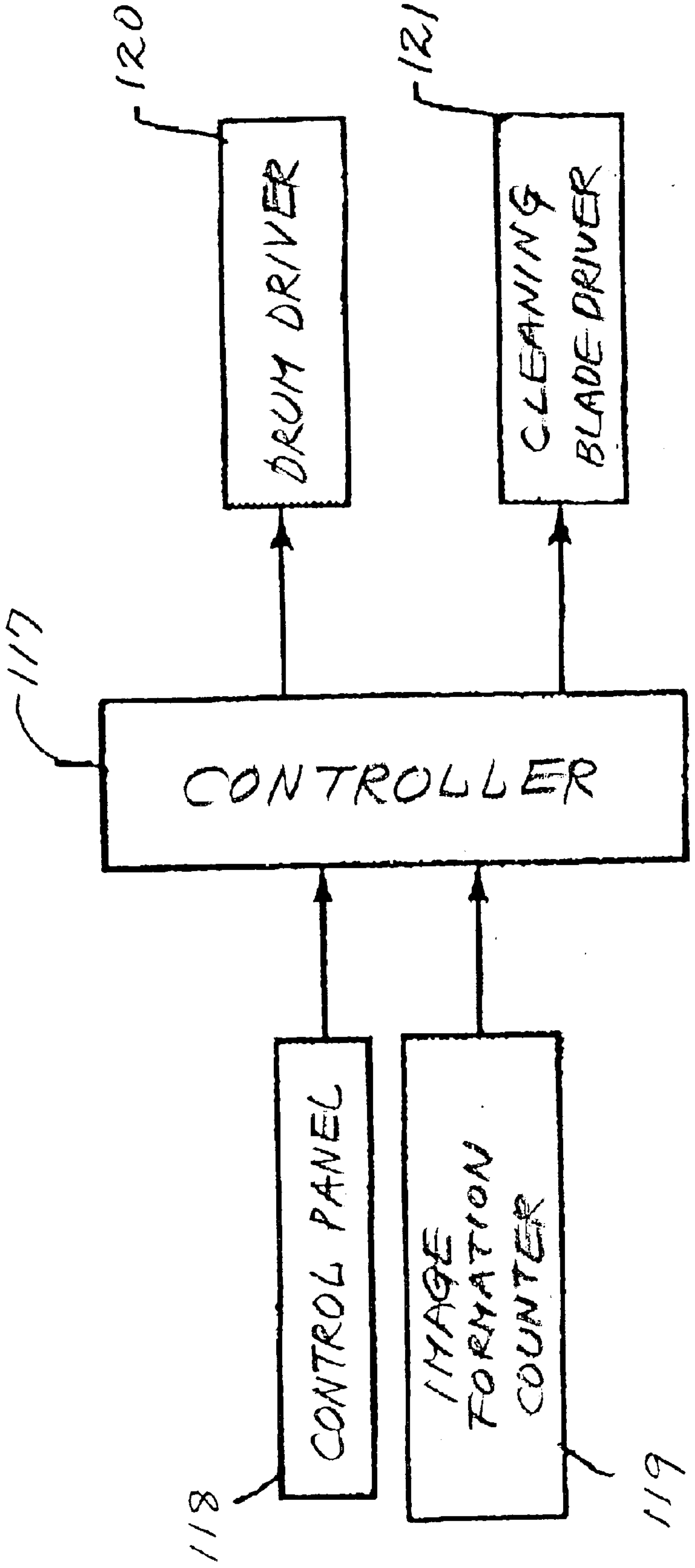
FIG. 12 is a schematic block diagram showing a control system included in the alternative embodiment.

FIG. 12 shows a control system included in the illustrative embodiment. As shown, the control system includes a controller 117 for executing the control over the drum 10 described above. A control panel 118 and an image formation counter 119 are connected to the input side of the controller 117 while a drum driver 120 and a cleaning blade driver 121 are connected to the output side of the controller 117.

The controller 117 determines, based on the number of times of image formation input on the control panel 118 or the operation of a start switch, whether or not the rotation of the drum 101 has ended. More specifically, when the number of times of image formation is input on the control panel 118, the controller 117 determines whether or not image formation has ended on the basis of the count of the image formation counter 119, and executes rotation control if the answer is positive. On the other hand, when the start switch is operated to start the initialization of the printer 100, the controller 117 executes rotation control after the drum 101 has been brought to a stop.

As for the reverse movement, the amount of movement of the drum 101 is selected such that the surface of the drum 110, facing the cleaning blade 108, does not move over the seal 111; in the illustrative embodiment, the amount of movement corresponds to a period of time of 40 ms to 60 ms. More specifically, the amount of movement corresponding to such a period of time is about 10 mm to 15 mm although dependent on the peripheral speed. This protects the cleaning blade 108 from wear and breakage.

Figure 13B:
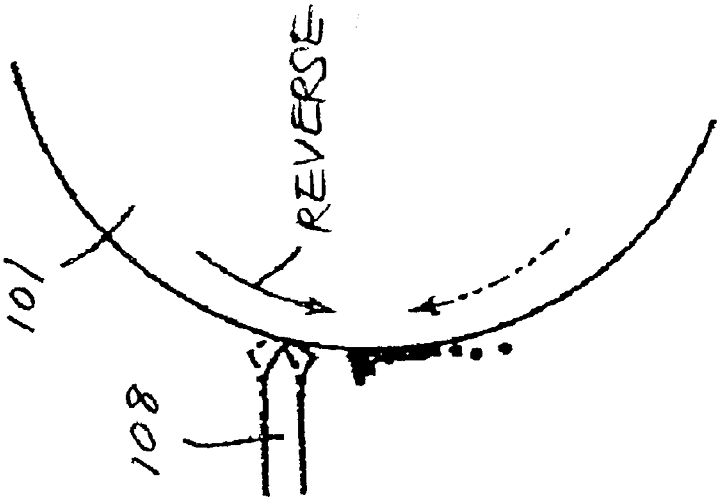
FIG. 13B is a view similar to FIG. 13A, showing a relation to occur when the drum is moved in the reverse direction.
Figure 13A:
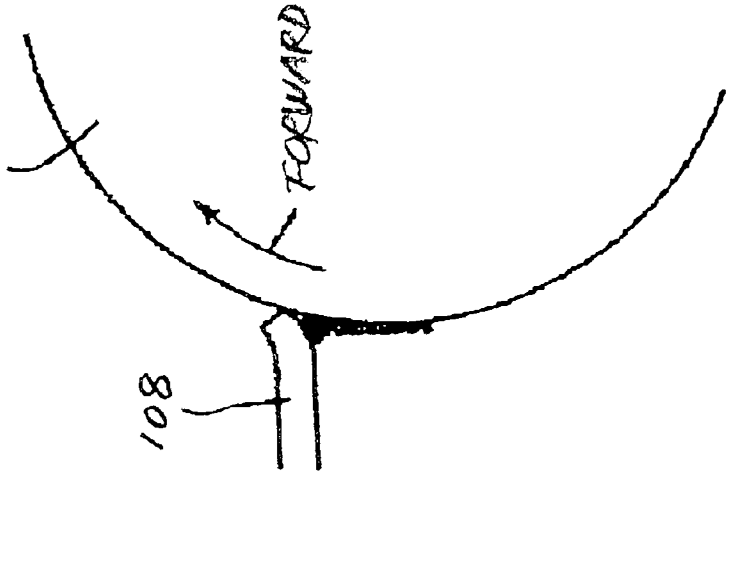
FIG. 13A is a view demonstrating how a photoconductive drum and a cleaning blade included in the alternative embodiment are related when the drum is moved in the forward direction.

When the drum 101 is moved in the reverse direction at least two times, impurities caught between the cleaning blade 108 and the drum 101 are conveyed away from the edge of the cleaning blade 108. At the same time, pressure, acting between the cleaning blade 108 and the drum 101, is canceled. FIG. 13A shows a specific condition wherein impurities are caught between the edge of the cleaning blade 108 and the drum 101 during the forward movement of the drum 101. As shown in FIG. 13B, when the drum 101 is moved in the reverse direction, as stated above, the impurities are conveyed away from the edge of the cleaning blade 108.

When the drum 101 is brought to a stop after the reverse movement, the edge of the cleaning blade 108 has been warped in opposite direction to warp occurred during the forward rotation of the drum 101 and therefore does not catch impurities. Further, the surface of the drum 101 does not move over the seal 111 during reverse movement, as stated earlier, so that the residual toner and impurities left on the drum 101 are prevented from being rubbed by the seal 111; otherwise, the residual toner and impurities would drop due to gravity or would come off due to rubbing.

The illustrative embodiment is also characterized by the configuration of the cleaning blade 108 cooperating with the cleaning roller 107. Particularly, in the illustrative embodiment, when the drum 101 is moved in the reverse direction, the contact pressure of the cleaning blade 108 can be reduced, and the reduced contact pressure is variable, as will be described in detail hereinafter.

Figure 14:
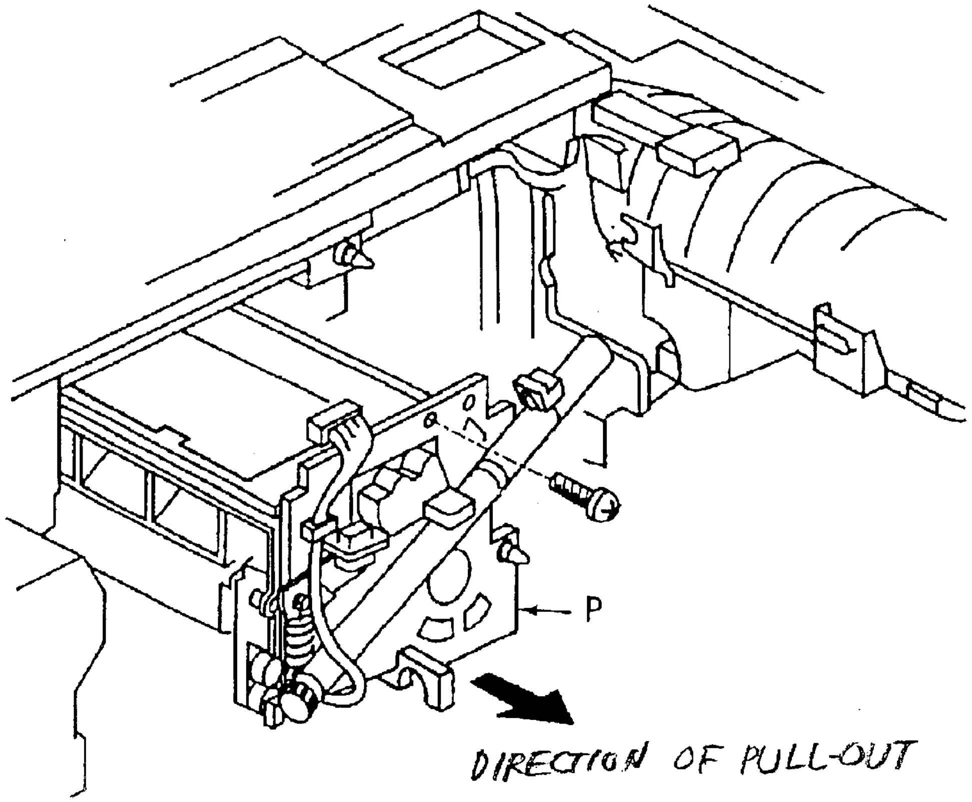
FIG. 14 is a perspective view showing a cartridge included in the alternative embodiment.

As shown in FIGS. 10 and 14, the drum 101, cleaning device 106 and other process units for image formation are mounted on a cartridge removable from the apparatus body in a direction P. In FIG. 10, the cleaning blade 108 is held in contact with the drum 101 in the counter direction. The cleaning blade 108 is mounted on a bracket 108A pivotable about a fulcrum 108B. A solenoid or similar pressure adjusting means 122 is connected to the end of the bracket 108A remote from the cleaning blade 108. Biasing means, not shown, constantly biases the cleaning blade 108 toward the drum 101 with preselected pressure that allows the blade 108 to scrape off impurities.

When the solenoid 122 is energized, it moves the bracket 108A in the direction in which the cleaning blade 108 moves away from the drum 101. As a result, the cleaning blade 108 contacts the drum 101 with a pressure lower than the contact pressure necessary for scraping off impurities. Such reduced pressure of the cleaning blade 108 can be maintained in accordance with the direction of movement of the drum 101, which will be described specifically later.

In the illustrative embodiment, when the drum 101 is moved in the reverse direction about the time when it is caused to stop rotating after image formation, the solenoid 122 is energized to reduce the contact pressure of the cleaning blade 108. Consequently, even if impurities scraped off from the drum 101 remain caught by the cleaning blade 108 due to the contact pressure, the impurities are successfully released from the cleaning blade 108 and removed.

At the time when the drum 101 is again caused to move in the forward direction for image formation after the reverse movement, the solenoid 122 is deenergized to cause the cleaning blade 108 to again contact the drum 101 with the contact pressure capable of scraping off impurities. Because the contact pressure of the cleaning blade 108 is lowered during reverse movement of the drum 101 and because impurities caught due to the coefficient of friction of the drum surface move in accordance with the movement of the drum surface, impurities caught between the cleaning blade 108 and the drum 101 are removed.

Four different systems (A) through (C) for reducing the contact pressure of the cleaning blade 108 are available with the illustrative embodiment:

(A) The higher pressure is replaced with the lower pressure when the surface of the drum 101 moves during reverse movement;

(B) The pressure is varied during reverse rotation in accordance with the number of times of image formation effected;

(C) A plurality of different pressures are selectively established during reverse rotation; and (D) The pressure is varied stepwise during reverse rotation.

The system (A) is effected by the turn-on and turn-off of the solenoid or similar pressure adjusting means 122. The other systems (B) through (D) are effected by a cam functioning as the pressure adjusting means 122 and having a variable stroke.

More specifically, as for the system (B), although the cleaning blade 108, contacting the drum 101 with the lower contact pressure after image formation, can remove impurities, the cleaning blade 108 may fail to remove the entire impurities in the short period of time assigned to reverse rotation. In light of this, assuming that the amount of impurities gotten through the cleaning blade 108 increases in proportion to the number of times of image formation effected, the degree by which the contact pressure is reduced is increased in accordance with the increase in the above frequency, i.e., the amount of impurities accumulated.

The systems (C) and (D) are derived from the same circumstances as the system (B) except for the following. If the contact pressure is varied in two steps as effected with the solenoid 122, then the cleaning blade 108 is brought into contact with the drum 101 with the contact pressure sharply changed when the higher pressure is restored. This brings about deformation and other mechanical troubles ascribable to a sharp change in load on the cleaning blade 108. To solve this problem, the systems (C) and (D) cause the cleaning blade 108 to softly land on the drum 101 when the higher pressure is restored. Further, because the contact pressure is lowered little by little or stepwise, the contact pressure of the cleaning blade 108 is lowered little by little from the time when the reverse rotation of the drum 101 begins. This allows impurities accumulated on the drum 101 to be removed little by little without sharply changing the collecting condition, i.e., without causing the collected impurities from dropping.

When the cam is used as the pressure adjusting means 122, the rate at which the contact pressure of the cleaning blade 108 decreases may also be adjusted to surely remove the accumulated impurities without causing the impurities to drop and fly about.

The systems (A) through (D) described above are executed by the controller 117, FIG. 12. The controller 117 sends a control signal to the pressure adjusting means 122 via the cleaning blade driver 121.

As stated above, in the illustrative embodiment, when the drum 101 completes its rotation for image formation, it is moved in the reverse direction and then stopped by the control described above. During the reverse movement, the contact pressure of the cleaning blade 108 is lowered with the result that pressure, acting on impurities caught between the cleaning blade 108 and the drum 101, is lowered or canceled, allowing the impurities accumulated on the edge of the blade 108 to be removed. Otherwise, some impurities would get through the cleaning blade due to the impurities accumulated on the edge of the cleaning blade 108 and would thereby bring about filming.

Further, the amount of reverse movement of the drum 101 is selected such that the surface of the drum 101, facing the cleaning blade 108, does not move over the seal 111, thereby preventing impurities from dropping around the cleaning device and smearing the peeler 113 and toner content sensor 112.

The movement control of the illustrative embodiment prevents impurities from being continuously caught between the drum 101 and the cleaning blade 108, compared to the case wherein the same portion of the drum 101 faces the edge of the cleaning blade 108 at all times. The cleaning blade 108 can therefore uniformly contact the drum 101 in the lengthwise direction thereof. Consequently, when the drum 101 starts rotating for image formation, the cleaning blade 108 scraps off impurities over again without allowing them to getting through the blade 108, enhancing cleaning efficiency to thereby reduce filming.

With various advantages described above, the illustrative embodiment realizes a highly efficient, reliable cleaning device for an image forming apparatus. Other advantages achievable with the illustrative embodiment are as follows. Work for reducing the coefficient of friction to a noticeable degree is not necessary, obviating the need for feeding a lubricant or similar special structure for reducing the coefficient of friction and therefore reducing cost. It is possible to extend the life of the drum 101, prevent the characteristics of the drum 101 from varying due to the variation of a film thickness, and protect the surface of the drum 101 from damage. Therefore, impurities are prevented from accumulating due to rubbing when the surface configuration of the drum 101 is deteriorated. Even when the drum 101 is formed of a hard material that is shaved off by the cleaning member little, only a blade or a brush suffices to collect impurities from the drum 101. Further, when a plurality of image forming sections are grounded, they can be maintained, inspected or replaced independently of each other and therefore at low cost, compared to a case wherein all image forming sections are done so at the same time.

Various modifications will become possible for those skilled in the art after receiving the teachings of the present disclosure without departing from the scope thereof.

What is claimed is:

1. In an image forming apparatus including a cleaning device for removing toner, paper dust and other impurities left on an image carrier after image transfer with a cleaning member, said cleaning member contacts a surface of said image carrier with variable contact pressure and remains, about a time when said image carrier stops moving after image formation, in contact with said surface with a lower pressure lower than a pressure capable of scrapping off the impurities, and said image carrier is moved, before an operation for image formation, in a reverse direction opposite to a forward direction assigned to image formation, then stopped, and again moved in said forward direction and then in said reverse direction at least one time.

2. The apparatus as claimed in claim 1, wherein said image carrier and said cleaning member are mounted on a single cartridge together with at least one of process units contributing to image formation.

3. The apparatus as claimed in claim 1, wherein the surface of said image carrier has a coefficient of friction $\mu$ of 0.2 or above.

4. The apparatus as claimed in claim 3, wherein said image carrier is formed of amorphous silicon.

5. The apparatus as claim in claim 4, wherein said image carrier and said cleaning member are mounted on a single cartridge together with at least one of process units contributing to image formation.

6. The apparatus as claimed in claim 3, wherein at least a surface layer of said image carrier contains inorganic grains.

7. The apparatus as claimed in claim 1, wherein when said cleaning member comprises a brush, said brush has loop-like tips and contact said image carrier with a surface pressure of 50 gf/cm$^2$ or above.

8. The apparatus as claimed in claim 7, wherein the surface of said image carrier has a coefficient of friction $\mu$ of 0.2 or above.

9. The apparatus as claimed in claim 8, wherein said image carrier is formed of amorphous silicon.

10. The apparatus as claim in claim 9, wherein said image carrier and said cleaning member are mounted on a single cartridge together with at least one of process units contributing to image formation.

11. The apparatus as claimed in claim 8, wherein at least a surface layer of said image carrier contains inorganic grains.

12. The apparatus as claimed in claim 1, wherein when said cleaning member comprises a cleaning blade, the contact pressure is variable in accordance with a number of times of image formation effected.

13. The apparatus as claimed in claim 12, wherein the contact pressure of said cleaning blade is variable from the pressure capable of scraping off the impurities to any one of a plurality of pressures.

14. The apparatus as claimed in claim 13, wherein when said cleaning member comprises a brush, said brush has loop-like tips and contact said image carrier with a surface pressure of 50 gf/cm$^2$ or above.

15. The apparatus as claimed in claim 14, wherein the surface of said image carrier has a coefficient of friction $\mu$ of 0.2 or above.

16. The apparatus as claimed in claim 15, wherein said image carrier is formed of amorphous silicon.

17. The apparatus as claim in claim 16, wherein said image carrier and said cleaning member are mounted on a single cartridge together with at least one of process units contributing to image formation.

18. The apparatus as claimed in claim 15, wherein at least a surface layer of said image carrier contains inorganic grains.

19. The apparatus as claimed in claim 12, wherein the contact pressure of said cleaning blade is variable in a plurality of steps during reverse rotation.

20. The apparatus as claimed in claim 1, wherein when said cleaning member comprises a cleaning blade, an edge of said cleaning blade, which is included in an end face, positioned at an upstream side in a direction of movement of said image carrier contacts the surface of said image carrier.

21. The apparatus as claimed in claim 20, wherein when said cleaning member comprises a cleaning blade, the contact pressure is variable in accordance with a number of times of image formation effected.

22. The apparatus as claimed in claim 21, wherein the contact pressure of said cleaning blade is variable from the pressure capable of scraping off the impurities to any one of a plurality of pressures.

23. The apparatus as claimed in claim 22, wherein when said cleaning member comprises a brush, said brush has loop-like tips and contact said image carrier with a surface pressure of 50 gf/cm$^2$ or above.

24. The apparatus as claimed in claim 23, wherein the surface of said image carrier has a coefficient of friction $\mu$ of 0.2 or above.

25. The apparatus as claimed in claim 24, wherein said image carrier is formed of amorphous silicon.

26. The apparatus as claim in claim 25, wherein said image carrier and said cleaning member are mounted on a single cartridge together with at least one of process units contributing to image formation.

27. The apparatus as claimed in claim 24, wherein at least a surface layer of said image carrier contains inorganic grains.

28. The apparatus as claimed in claim 21, wherein the contact pressure of said cleaning blade is variable in a plurality of steps during reverse rotation.

29. The apparatus as claimed in claim 1, wherein said cleaning member comprises either one of a cleaning blade and a cleaning brush capable of contacting said image carrier.

30. The apparatus as claimed in claim 29, wherein when said cleaning member comprises a cleaning blade, an edge of said cleaning blade, which is included in an end face, positioned at an upstream side in a direction of movement of said image carrier contacts the surface of said image carrier.

31. The apparatus as claimed in claim 30, wherein when said cleaning member comprises a cleaning blade, the contact pressure is variable in accordance with a number of times of image formation effected.

32. The apparatus as claimed in claim 31, wherein the contact pressure of said cleaning blade is variable from the pressure capable of scraping off the impurities to any one of a plurality of pressures.

33. The apparatus as claimed in claim 32, wherein when said cleaning member comprises a brush, said brush has loop-like tips and contact said image carrier with a surface pressure of 50 gf/cm$^2$ or above.

34. The apparatus as claimed in claim 33, wherein the surface of said image carrier has a coefficient of friction $\mu$ of 0.2 or above.

35. The apparatus as claimed in claim 34, wherein said image carrier is formed of amorphous silicon.

36. The apparatus as claim in claim 35, wherein said image carrier and said cleaning member are mounted on a single cartridge together with at least one of process units contributing to image formation.

37. The apparatus as claimed in claim 34, wherein at least a surface layer of said image carrier contains inorganic grains.

38. The apparatus as claimed in claim 31, wherein the contact pressure of said cleaning blade is variable in a plurality of steps during reverse rotation.

39. The apparatus as claimed in claim 1, wherein said cleaning member is disposed in a casing formed with an opening, which faces said image carrier, and comprising a sealing member fitted on one of edges of said opening positioned at an upstream side in a direction of movement of said image carrier for image formation for blocking the impurities, and an amount of movement of said image carrier in the reverse direction is selected such that a portion of said image carrier contacting said cleaning blade does not move over said sealing member.

40. The apparatus as claimed in claim 39, wherein said cleaning member comprises either one of a cleaning blade and a cleaning brush capable of contacting said image carrier.

41. The apparatus as claimed in claim 40, wherein when said cleaning member comprises a cleaning blade, an edge of said cleaning blade, which is included in an end face, positioned at an upstream side in a direction of movement of said image carrier contacts the surface of said image carrier.

42. The apparatus as claimed in claim 41, wherein when said cleaning member comprises a cleaning blade, the contact pressure is variable in accordance with a number of times of image formation effected.

43. The apparatus as claimed in claim 42, wherein the contact pressure of said cleaning blade is variable from the pressure capable of scraping off the impurities to any one of a plurality of pressures.

44. The apparatus as claimed in claim 43 wherein when said cleaning member comprises a brush, said brush has loop-like tips and contact said image carrier with a surface pressure of 50 $gf/cm^2$ or above.

45. The apparatus as claimed in claim 44, wherein the surface of said image carrier has a coefficient of friction $\mu$ of 0.2 or above.

46. The apparatus as claimed in claim 45, wherein said image carrier is formed of amorphous silicon.

47. The apparatus as claim in claim 46, wherein said image carrier and said cleaning member are mounted on a single cartridge together with at least one of process units contributing to image formation.

48. The apparatus as claimed in claim 45, wherein at least a surface layer of said image carrier contains inorganic grains.

49. The apparatus as claimed in claim 42, wherein the contact pressure of said cleaning blade is variable in a plurality of steps during reverse rotation.

50. The apparatus as claimed in claim 1, wherein the contact pressure of said cleaning member is lowered below the pressure capable of scraping off impurities during reverse movement of said image carrier.

51. The apparatus as claimed in claim 50, wherein said cleaning member is disposed in a casing formed with an opening, which faces said image carrier, and comprising a sealing member fitted on one of edges of said opening positioned at an upstream side in a direction of movement of said image carrier for image formation for blocking the impurities, and an amount of movement of said image carrier in the reverse direction is selected such that a portion of said image carrier contacting said cleaning blade does not move over said sealing member.

52. The apparatus as claimed in claim 51, wherein said cleaning member comprises either one of a cleaning blade and a cleaning brush capable of contacting said image carrier.

53. The apparatus as claimed in claim 52, wherein when said cleaning member comprises a cleaning blade, an edge of said cleaning blade, which is included in an end face, positioned at an upstream side in a direction of movement of said image carrier contacts the surface of said image carrier.

54. The apparatus as claimed in claim 53, wherein when said cleaning member comprises a cleaning blade, the contact pressure is variable in accordance with a number of times of image formation effected.

55. The apparatus as claimed in claim 54, wherein the contact pressure of said cleaning blade is variable from the pressure capable of scraping off the impurities to any one of a plurality of pressures.

56. The apparatus as claimed in claim 55, wherein when said cleaning member comprises a brush, said brush has loop-like tips and contact said image carrier with a surface pressure of 50 $gf/cm^2$ or above.

57. The apparatus as claimed in claim 56, wherein the surface of said image carrier has a coefficient of friction $\mu$ of 0.2 or above.

58. The apparatus as claimed in claim 57, wherein said image carrier is formed of amorphous silicon.

59. The apparatus as claim in claim 58, wherein said image carrier and said cleaning member are mounted on a single cartridge together with at least one of process units contributing to image formation.

60. The apparatus as claimed in claim 57, wherein at least a surface layer of said image carrier contains inorganic grains.

61. The apparatus as claimed in claim 54, wherein the contact pressure of said cleaning blade is variable in a plurality of steps during reverse rotation.

* * * * *